(12) United States Patent
Rock et al.

(10) Patent No.: US 8,092,957 B2
(45) Date of Patent: Jan. 10, 2012

(54) DIFFUSION MEDIA FORMED BY PHOTOPOLYMER BASED PROCESSES

(75) Inventors: Jeffrey A. Rock, Fairport, NY (US);
Yeh-Hung Lai, Webster, NY (US);
Keith E. Newman, Athens, PA (US);
Gerald W. Fly, Geneseo, NY (US);
Alan J. Jacobsen, Pacific Palisades, CA (US); Peter D. Brewer, Westlake Village, CA (US); William B. Carter, Santa Monica, CA (US); Robert E. Doty, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 12/466,646

(22) Filed: May 15, 2009

(65) Prior Publication Data

US 2010/0291466 A1    Nov. 18, 2010

(51) Int. Cl.
*H01M 4/36*    (2006.01)
*H01M 8/10*    (2006.01)

(52) U.S. Cl. .......................... 429/534; 429/480; 429/481
(58) Field of Classification Search ........................ None
See application file for complete search history.

(56) References Cited

U.S. PATENT DOCUMENTS

| | | |
|---|---|---|
| 6,274,288 B1 | 8/2001 | Kewitsch et al. |
| 7,382,959 B1 | 6/2008 | Jacobsen |
| 2010/0159294 A1* | 6/2010 | Fly et al. ........................ 429/12 |

OTHER PUBLICATIONS

Microstereolithography: Concepts and applications; Arnaud Bertsch, Paul Bernhard, Philippe Renaud; (c) 2001 IEEE.
Microstereolithography: a Review; Arnard Bertsch, Sebastien Jiguet, Paul Bernhard, Philippe Renaud; Swiss Federal Institute of Technology,(c) 2003 Material Research Society.
Characterisation of Epoxy Resins for Microstereolithographic Rapid Prototyping; C.R. Chatwin, M. Farsari, S. Huang, M.I. Heywood, R.C.D. Young P.M. Birch, F. Claret-Tournier and J.D. Richardson, School of Engineering, University of Sussex, Falmer, Brighton, UK; (c) 1999 Springer-Verlag London Limited.
Two-Photon Photopolymerization and 3D Lithographic Microfabrication; Hong-Bo Sun, Satoshi Kawata; Depart of Applied Physics, Osaka University, Japan; APS (2004) (c) Springer-Verlag 2004.
Fabrication and moulding of cellular materials by rapid prototyping; J. Stampfl, H. Houad and S. Seidler; Institute of Material Science and Testing, Vienna University of Technology, Austria; R Liska and F. Schwager; Institute of Applied Synthetic Chemistry, Vienna University of Technology, Austria; A Woesz and P Fratzl; Max Planck Institute of Colloids and Interfaces, Germany; Int. J. Materials and Product Technology, vol. 21, No. 4, 2004, (c) Inderscience Enterprises Ltd.
Acta Materialia 55 (2007) 6724-6733, Compression behavior of micro-scale truss structures formed from self-propagating polymer waveguides; Alan J. Jacobsen, William Barvosa-Carter, Steven Nutt. Published by Elsevier Ltd.

\* cited by examiner

*Primary Examiner* — Emily Le
*Assistant Examiner* — Sarah A Slifka
(74) *Attorney, Agent, or Firm* — Fraser Clemens Martin & Miller LLC; J. Douglas Miller (57) ABSTRACT

A diffusion medium layer for a fuel cell, including an electrically conductive microtruss structure disposed between a pair of electrically conductive grids is provided. At least one of the microtruss structure and the grids is formed from a radiation-sensitive material. A fuel cell having the diffusion medium layer and a method for fabricating the diffusion medium layer is also provided.

20 Claims, 6 Drawing Sheets

DIFFUSION MEDIA FORMED BY PHOTOPOLYMER BASED PROCESSES

FIELD OF THE INVENTION

The present disclosure relates to a fuel cell and more particularly to fuel cell diffusion media manufactured by photopolymerization.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media which facilitates a delivery of reactants, such as hydrogen to the anode and oxygen to the cathode. The porous diffusion media are sometimes referred to as gas diffusion media or gas diffusion layers. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

It is also known to use other reactants in the PEM fuel cell such as methanol, for example. Methanol may be catalytically oxidized to form carbon dioxide. Protons from the methanol oxidation are transported across the electrolyte membrane to the cathode where they react with oxygen, typically from air, to generate water. As with the hydrogen PEM fuel cell, electrons are transported as an electric current through the external load, such as the electric motor, from the anode to the cathode.

The diffusion media is typically formed from a porous material adapted to perform a multifunctional role in the fuel cell. It is known to manufacture the diffusion media from carbon paper, such as TGP-H-030 commercially available from Toray Industries, Inc., for example. Carbon paper is typically suitable for distributing reactants, gaseous or otherwise, to the electrodes of the fuel cell. The diffusion media also conducts electrons and transfers heat generated at the MEA to a coolant. With respect to water management of the fuel cell, the diffusion media transports water produced by the electrochemical fuel cell reaction away from the PEM. The water management capability of the diffusion media is critical to any optimization of fuel cell performance. The diffusion media may further include a microporous layer that provides a transition layer between the electrodes and the diffusion media and facilitates the water removal from the PEM.

Alternative types of porous materials have been described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One method and system of creating polymer materials with ordered microtruss structures is disclosed by Jacobsen in U.S. Pat. No. 7,382,959, the entire disclosure of which is hereby incorporated herein by reference. The system includes at least one collimated light source selected to produce a collimated light beam; a reservoir having a photo-monomer adapted to polymerize by the collimated light beam; and a mask having at least one aperture and positioned between the at least one collimated light source and the reservoir. The at least one aperture is adapted to guide a portion of the collimated light beam into the photo-monomer to form the at least one polymer waveguide through a portion of a volume of the photo-monomer. Microtruss materials produced by the method and system are further disclosed by Jacobsen in U.S. patent application Ser. No. 11/801,908, the entire disclosure of which is hereby incorporated herein by reference. A polymer material that is exposed to radiation and results in a self-focusing or self-trapping of light by formation of polymer waveguides is also described by Kewitsch et al. in U.S. Pat. No. 6,274,288, the entire disclosure of which is hereby incorporated herein by reference.

There is a continuing need for a structure and method of manufacturing fuel cell diffusion media that optimizes fuel cell durability, minimizes tooling costs, minimizes production costs, and minimizes development time.

SUMMARY OF THE INVENTION

In concordance with the instant disclosure, a structure and method of manufacturing fuel cell diffusion media that optimizes fuel cell durability, minimizes tooling costs, minimizes production costs, and minimizes development time, is surprisingly discovered.

In a first embodiment, a diffusion medium layer for a fuel cell includes an electrically conductive microtruss structure disposed between a pair of electrically conductive grids. At least one of the microtruss structure and the grids is formed from a radiation-sensitive material.

In another embodiment, a fuel cell includes a pair of the diffusion medium layers having a membrane electrode assembly interposed therebetween. The diffusion medium layers and the membrane electrode assembly are disposed between a pair of electrically conductive fuel cell plates to complete the fuel cell.

In a further embodiment, a method for fabricating a diffusion medium layer for a fuel cell, includes the steps of: providing a substrate; applying a first radiation-sensitive material, a second radiation-sensitive material, and a third radiation-sensitive material to the substrate, the second radiation-sensitive material disposed between the first radiation-sensitive material and the third radiation-sensitive material; placing a mask between an at least one radiation source and the first, second, and third radiation-sensitive materials, the mask extending along a single plane and having a plurality of substantially radiation-transparent apertures formed therein; exposing the first, second, and third radiation-sensitive materials to a plurality of at least partially decollimated radiation beams through the radiation-transparent apertures in the mask, whereby a pair of grids are formed in the first and third radiation-sensitive materials; and exposing the first, second, and third radiation-sensitive materials to a plurality of collimated radiation beams through the radiation-transparent apertures in the mask, whereby a microtruss structure is formed in the second radiation-sensitive material between the pair of grids.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
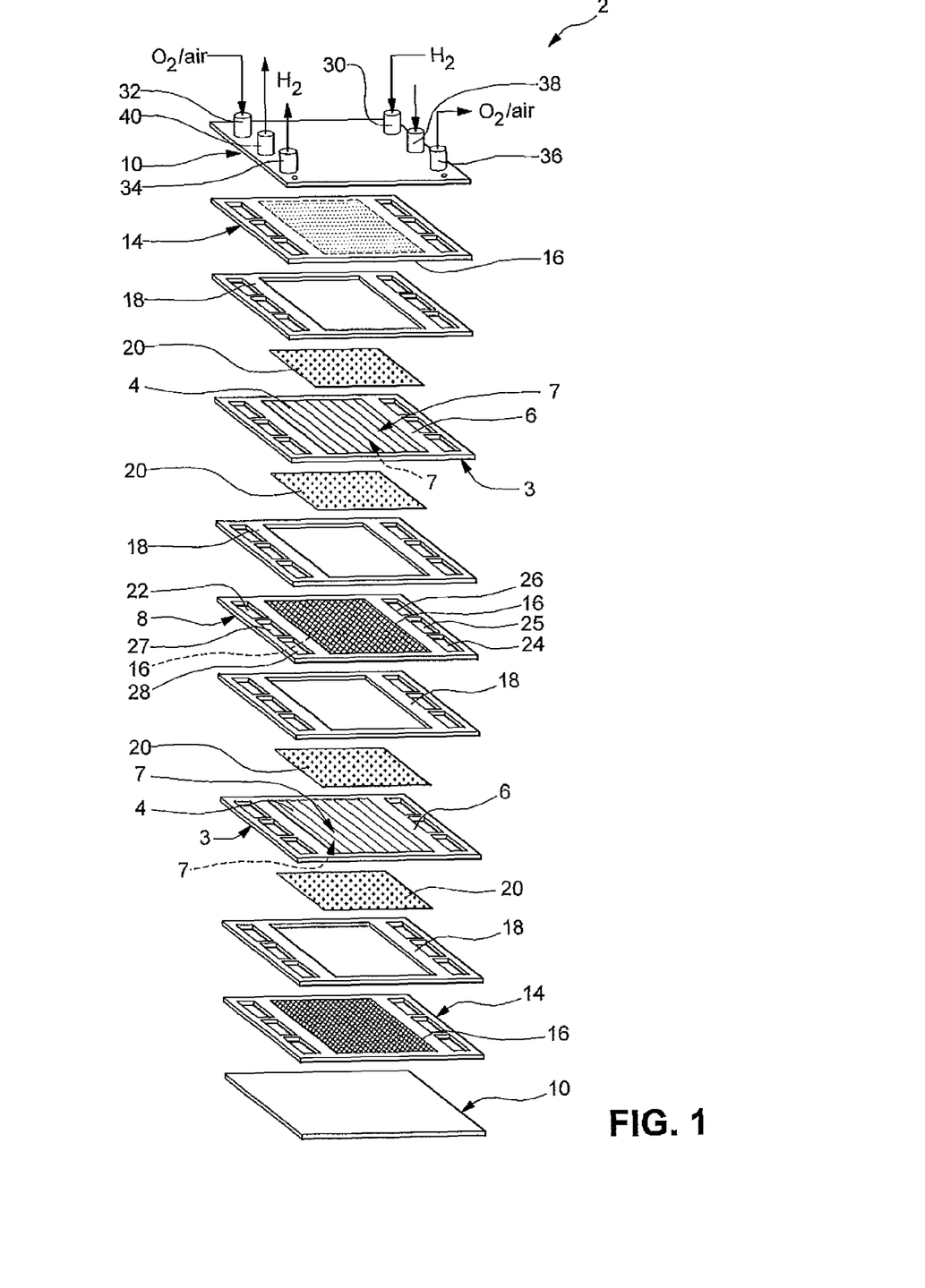
FIG. 1 is an exploded, schematic perspective view of a fuel cell according to the present disclosure.

FIG. 1 depicts a PEM fuel cell stack 2 according to the present disclosure. For simplicity, only a two-cell stack (i.e. one bipolar plate) is illustrated and described in FIG. 1, it being understood that a typical fuel cell stack 2 will have many more such cells and bipolar plates. The fuel cell stack 2 includes at least one membrane electrode assembly (MEA) 3. The MEA 3 may be formed from an electrolyte membrane 4 supported by a subgasket 6. The electrolyte membrane 4 is sandwiched between a pair of electrodes 7. Although the MEAs 3 having a catalyst coated membrane (CCM) design are shown for purpose of simplicity, it should be understood that the fuel cell stack 2 may employ a catalyst coated diffusion media (CCDM) design, if desired.

An electrically conductive bipolar plate 8 separates the MEAs 3. The electrolyte membranes 4, the electrodes 7, and the bipolar plate 8 are stacked together between a pair of clamping plates 10, and a pair of unipolar end plates 14. The clamping plates 10 are electrically insulated from the unipolar end plates 14, for example, by a gasket or a dielectric coating (not shown). The unipolar end plates 14 and the bipolar plate 8 include active areas 16 for distributing reactants, such as hydrogen gas and oxygen/air, to the electrodes 7. The bipolar plate 8 and the unipolar end plates 14 may further include a plurality of flow channels (not shown) configured to distribute the reactants to the electrodes 7. The fuel cell stack 2 may include nonconductive gaskets 18 to provide seals and electrical insulation between the components of the fuel cell stack 2. If the subgaskets 6 sufficiently seal and electrically insulate the fuel cell stack 2, however, it should be appreciated that the gaskets 18 may not be employed, as desired.

The fuel cell stack 2 according to the present invention includes a porous, electrically conductive diffusion medium layer 20 formed at least in part from a radiation-sensitive material. The formation of radiation-cured structures such as the diffusion medium layer 20 from the radiation sensitive material is described, for example, in Assignee's co-pending U.S. patent application Ser. No. 12/339,308, the entire disclosure of which is hereby incorporated herein by reference.

The porous diffusion medium layers 20 abut the electrodes 7 disposed adjacent the electrolyte membrane 4, and are configured to distribute the fuel cell reactants thereto. The diffusion medium layers 20 are disposed between the electrodes 7 and the bipolar plate 8, and between the electrolyte membrane 4 and the unipolar end plate 14. A skilled artisan should appreciate that the diffusion medium layers 20 may also have microporous layers (not shown) disposed between the diffusion medium layers 20 and the electrodes 7, as desired.

The MEAs 3, bipolar plate 8, unipolar end plates 14, and the gaskets 18 each include a cathode supply aperture 22 and a cathode exhaust aperture 24, a coolant supply aperture 25 and a coolant exhaust aperture 27, and an anode supply aperture 26 and an anode exhaust aperture 28. Supply manifolds and exhaust manifolds of the fuel cell stack 2 are formed by an alignment of the respective apertures 22, 24, 25, 26, 27, 28 in the subgaskets 6, bipolar plate 8, unipolar end plates 14, and the gaskets 18. Hydrogen gas is supplied to an anode supply manifold via an anode inlet conduit 30. The oxygen/air is supplied to a cathode supply manifold of the fuel cell stack 2 via a cathode inlet conduit 32. An anode outlet conduit 34 and a cathode outlet conduit 36 are also provided for an anode exhaust manifold and a cathode exhaust manifold, respectively. A coolant inlet conduit 38 is provided for supplying liquid coolant to a coolant supply manifold. A coolant outlet conduit 40 is provided for removing coolant from a coolant exhaust manifold. It should be understood that the configurations of the various inlets 30, 32, 38 and outlets 34, 36, 40 in FIG. 1 are for the purpose of illustration, and other configurations may be chosen as desired.

Figure 2:
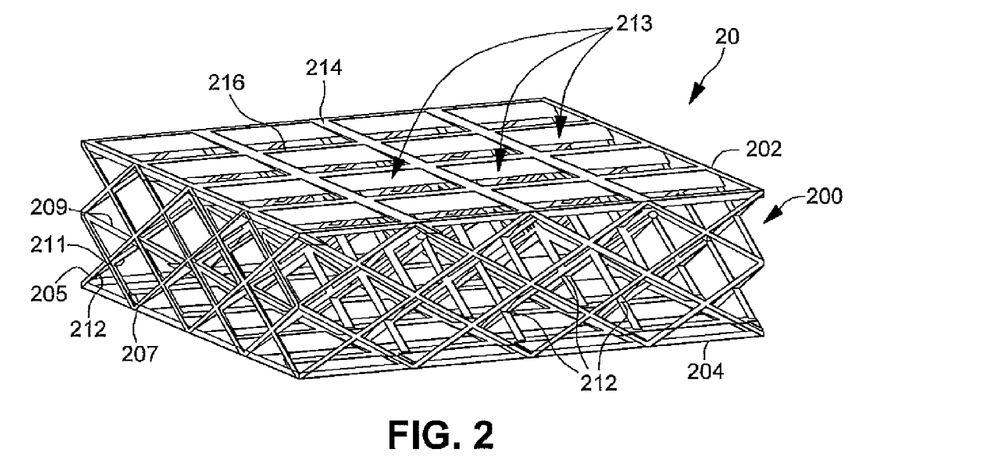
FIG. 2 is a partial, side perspective view of a diffusion medium layer according to one embodiment the present disclosure.
Figure 3:
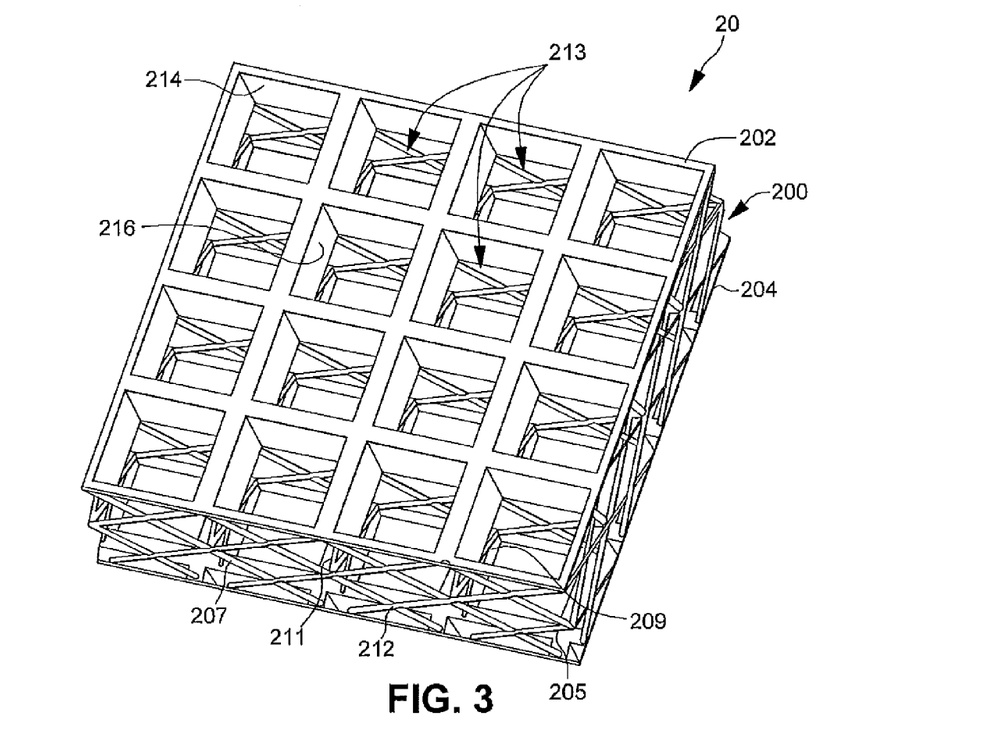
FIG. 3 is a partial, top perspective view of the diffusion medium layer shown in FIG. 2.
Figure 4:
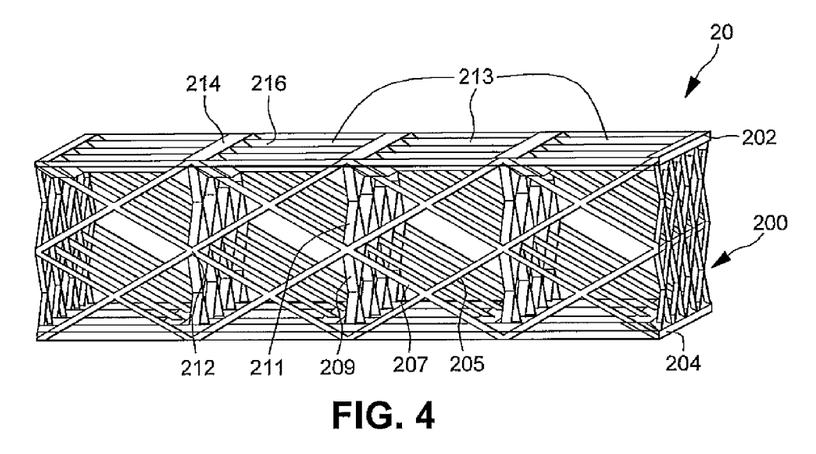
FIG. 4 is a partial, side perspective view of the diffusion medium layer shown in FIG. 2.

As shown in FIGS. 2-4, the diffusion medium layer 20 includes a microtruss structure 200 disposed between a pair of grids 202, 204. The diffusion medium layer 20 is porous and electrically conductive. At least one of the microtruss structure 200 and the grids 202, 204 is formed from the radiation-sensitive material. The radiation-sensitive materials employed to form at least one of the microtruss structure 200 and the grids 202, 204 according to the present disclosure includes radiation-curable materials and radiation-dissociable materials. The term "radiation-curable material" is defined herein as any material that is at least one of initiated, polymerized, and crosslinked by exposure to radiation. It should be appreciated that an increase in temperature may also be employed to at least partially complete polymerization or crosslinking of the radiation-curable materials following an initiation by the exposure to radiation. The term "radiation-dissociable material" is defined herein as any material that exhibits at least one of a scissioning of the polymer backbone and a decrosslinking by exposure to radiation. As a nonlimiting example, the radiation-dissociable material may be made solvent-soluble by a sufficient breakage of crosslinks and/or scissioning of the polymer backbone of the radiation-dissociable material.

As nonlimiting examples, the radiation-curable materials may include one of a liquid photomonomer and a substantially solid radiation-curable polymer. The liquid photomonomer may be a monomer as described by Jacobsen in U.S. Pat. No. 7,382,959 and U.S. application Ser. No. 11/801,908. Nonlimiting examples of suitable photomonomers include monomers that polymerize via free-radical polymerization when exposed to UV radiation (wavelength between about 250 nm and about 400 nm). The photomonomer may include any suitable free-radical photopolymer material such as urethanes (polyurethanes), acrylates, methacrylates, and cationic polymers such as photo-cured epoxies. Other suitable photomonomers may also be employed.

Suitable substantially solid radiation-curable polymers may include negative resist polymers. Negative resist polymers go through a photoinitiation process that leads to a curing of the negative resist polymer by polymerization or polycondensation, for example. Where the polymerization or polycondensation reaction occurs at substantially the same time, the process is referred to as "photocured". Where only the reaction species are generated by the photoinitiation process and a subsequent step such a heating is required to generate the polymerization or polycondensation, the process is be referred to as "photoinitiated". It should be appreciated that even though a post-cure heat treatment may be necessary to finalize the polymerization step, substantially stable radiation-cured features in the negative photoresist polymer may also be created during the initial radiation exposure. The substantially solid radiation-sensitive polymers can go through just the initiation process and, due to inherent stability and the limited diffusion rate of the chemical species within the solid radiation-sensitive polymers, the curing process may also be performed much later without significant feature degradation. It should be appreciated that most photoinitiated polymers begin the curing process at the inception of the initiation process, but the kinetics of the reaction at the exposure temperature are so slow that little, if any, polymerization or polycondensation may take place prior to heating the negative resist polymer to a desired curing temperature.

One particular negative resist polymer is the epoxy-based SU-8 2000™ negative resist polymer, commercially available from Microchem Corporation in Newton, Mass. The SU-8 2000™ negative resist polymer is curable by UV radiation. It should be appreciated that other substantially solid radiation-curable polymers may be employed. For example, similar to the photomonomers described above, the radiation-curable polymer selected may be cured with radiation of wavelengths other than UV radiation, as desired. The radiation-curable polymer may also be selected to have a slower cure rate than the liquid photomonomer, for example, to militate against features from appearing in the slower curing layer with exposure of the faster curing layer to a radiation source.

As a nonlimiting example, the radiation-dissociable materials may include positive resist polymers. Positive resist polymers begin as crosslinked polymers but may contain photoinitiators that, when exposed to a particular radiation, generate chemical species which dissociate the polymer by at least one of breaking the crosslinks and scissioning the polymer backbone. The dissociation makes the positive resist polymer soluble in the regions which have been exposed to the radiation. Regions where the positive resist polymer remains cured are masked rather than being exposed, as is the case with the negative resist polymers described hereinabove.

In certain embodiments, the positive resist polymers are sensitive to radiation, e.g., ultraviolet or electron beam, without the need for photoinitiators. For example, the positive resist polymer may itself be damaged by the radiation and the remaining scissioned chains become soluble in a solvent. Other types of positive resist polymers may be employed, as desired.

The radiation employed to one of cure and dissociate the radiation-sensitive materials may include a UV beam from a Mercury arc lamp, for example. The radiation may be electromagnetic radiation or particle radiation, as desired. A skilled artisan understands that radiation of other wavelengths, such as infrared, visible light, and X-ray radiation, and from other sources, such as incandescent lights and lasers, may also be employed. Particle radiation such as an electron beam from a cathode ray source may also be employed. It should be further understood that the radiation may be collimated, partially collimated, or non-collimated, as desired.

The radiation is typically directed to the radiation-sensitive material via at least one mask 710 (shown in FIGS. 7 to 10) having apertures or openings formed therein, through which the radiation may contact the radiation-sensitive material. The radiation exposure could be from a single collimated beam such as a laser, for example. The apertures may be substantially radiation-transparent apertures formed in an otherwise opaque or radiation-blocking material, for example. The mask 710 may be formed from a plane of glass or a Mylar sheet, for example, and facilitate the directing of radiation beams at an angle relative to either the mask or the underlying radiation-sensitive material. The mask 710 may be lifted away after an exposure and cleaned for reuse. The apertures or openings formed in the mask 710 have shapes that provide radiation beams to form polymer structures with a desired cross-sectional shape. The apertures may be substantially circular to create elliptical cross-sectional shapes that may better adjust to differences in coefficient of thermal expansion (CTE) within the diffusion medium layer 20.

In one illustrative embodiment, a surface of the mask 710 has a plurality of holes with a diameter of about 10 microns. The exposure to radiation may be conducted intermittently in a series of short exposures, for example, or in longer durations to provide the desired structural design. A skilled artisan may select suitable mask materials, aperture and opening sizes and shapes, and resulting structural configurations, as desired.

The microtruss structure 200 of the diffusion medium layer 20 may include a plurality of first truss elements 205 that extend along a first direction, a plurality of second truss elements 207 that extend along a second direction, a plurality of third truss elements 209 that extend along a third direction, and a plurality of fourth truss elements 211 that extend along a fourth direction. The first, second, third, and fourth truss elements 205, 207, 209, 211 may interpenetrate each other at a plurality of nodes 212. It should be appreciated that the first, second, third, and fourth truss elements 205, 207, 209, 211 may not interpenetrate each other, or may interpenetrate each other at the plurality of nodes 212 on an intermittent basis, as desired. The nodes 212 may also be selectively formed adjacent one of the grids 202, 204, for example. The first, second, third, and fourth truss elements 205, 207, 209, 211 form a continuous, three dimensional, self supporting cellular structure.

Although the microtruss structure 200 with the plurality of first truss elements 205, the plurality of second truss elements 207, the plurality of third truss elements 209, and the plurality of fourth truss elements 211 may have a 4-fold architectural symmetry as described hereinabove, a skilled artisan should appreciate that other architectures for the microtruss structure 200, such as a 3-fold symmetry and a 6-fold symmetry, may be employed within the scope of the present disclosure. The particular architecture may be selected, for example, to increase the microtruss structure 200 connectivity and reduce susceptibility to bending and buckling of the microtruss structure 200 under a load. The selected architecture may be symmetrical or asymmetrical, as desired. The architecture may also be selected to optimize strength and stiffness of the microtruss structure 200. One of ordinary skill in the art should further understand that the other architectures for microtruss structure 200 may be employed, as desired.

Exemplary architectures of the microtruss structure 200 are described by Jacobsen in U.S. Pat. No. 7,382,959 and U.S. patent application Ser. No. 11/801,908. For example, the plurality of first truss elements 205 may be defined by a plurality of first self-propagating polymer truss waveguides. The plurality of second truss elements 207 may be defined by a plurality of second self-propagating polymer truss waveguides. The plurality of third truss elements 209 may be defined by a plurality of third self-propagating polymer truss waveguides. Other suitable means of forming the microtruss structure 200 may be employed as desired.

One of ordinary skill in the art should appreciate that the particular microtruss structure 200 can be designed as desired, for example, by at least one of: 1) selecting the angles and the patterns of the polymer truss elements 205, 207, 209 with respect to one another, 2) adjusting the packing, or relative density of the resulting cellular structure, and 3) selecting the cross-sectional shapes and dimensions of the polymer truss elements 205, 207, 209. In particular, polymer truss elements 205, 207, 209 having an elliptical truss cross-sectional shape may militate against degradation with differences in coefficient of thermal expansion. Other cross-sectional shapes may also be employed, as desired.

The grids 202, 204 of the present disclosure may have a surface that facilitates a stacking of the diffusion medium layer 20 between the MEA 3 and the bipolar plate 8. As a nonlimiting example, the surface of the grids 202, 204 may be substantially planar. The grids 202, 204 further have a plurality of openings 213 formed therein. The openings 213 facilitate reactant distribution and water movement through the diffusion medium layer 20. Illustratively, the grids 202, 204 may be formed from a plurality of first walls 214 extending along a first direction and a plurality of second walls 216 extending along a second direction. The first and second walls 214, 216 may intersect to form the plurality of openings 213 in the grids 202, 204. The first and second walls 214, 216 may form openings 213 having a quadrilateral shape, such as a square shape, rectangular shape, or diamond shape, for example. It should be appreciated that other shapes for the openings 213 may be selected, as desired.

The diffusion medium layer 20 is electrically conductive. The diffusion medium layer 20 may be coated with an electrically conductive material. As a nonlimiting example, at least one of the microtruss structure 200 and the grids 202, 204 may be plated with a metal coating that is substantially oxidation resistant, reduction resistant, and acid-resistant. The electrically conductive material may include a noble metal selected from the group consisting of: ruthenium (Ru), rhodium (Rh), palladium (Pd), silver (Ag), iridium (Ir), platinum (Pt), and osmium (Os), and alloys thereof, for example. In a particular embodiment, the electrically conductive material is gold (Au). In another particular embodiment, the electrically conductive material is tantalum (Ta). Another suitable metal coating may include nickel (Ni) alloys, such as alloys of nickel and chromium (Cr) or nickel and cobalt (Co). As should be recognized by one of ordinary skill in the art, the electrically conductive material may include mixtures or alloys of the above identified metals. Other electrically conductive metals and materials may also be employed, as desired.

The electrically conductive material may be deposited on at least one of the microtruss structure 200 and the grids 202, 204 by one of electron beam evaporation, magnetron sputtering, physical vapor deposition, chemical vapor deposition, atomic layer deposition, electrolytic deposition, electroless deposition, flame spray deposition, brush plating, and other like processes. Solution based electroplating techniques that include immersing the at least one of the microtruss structure 200 and the grids 202, 204 in a plating bath may also be employed. Application of electrically conductive material in the form of a slurry powder and subsequently firing the slurry powder to form the coating may also be used. A skilled artisan may select more than one deposition technique to take into account differences between line of sight and non-line of sight characteristics of the deposition techniques selected. In certain embodiments, the electrically conductive material may be substantially evenly deposited on both the interior and exterior surfaces of the microtruss structure 200 and the grids 202, 204. Suitable means for coating and thicknesses of the electrically conductive material onto the microtruss structure 200 and the grids 202, 204 of the diffusion medium layer 20 may be selected as desired.

In a particularly illustrative embodiment, the electrically conductive material may be coated onto at least one of the microtruss structure 200 and the grids 202, 204 in multiple plating steps. For example, the electrically conductive coating may be formed by application of a first layer of an electroless nickel base followed by a second layer of NiCr or Cr plating for corrosion resistance and a third layer of an overcoating with Au or Pd for the minimization of contact resistance between the diffusion medium layer 20 and the bipolar plate B. The first layer and the second layer may be plated on, and the third layer applied by physical vapor deposition to limit coverage, for example. Other methods for coating the electrically conductive material onto the diffusion medium layer 20 may be employed as desired.

It should be appreciated that the electrically conductive material may also be a metal oxide or ceramic. In certain illustrative embodiments, at least one of the microtruss structure 200 and the grids 202, 204 may be coated with the metal oxide or the ceramic to provide the desirable level of bending strength and electrical conductivity. Suitable ceramic microtruss structures 200 and methods for preparing ceramic microtruss structures 200 are disclosed by Gross et al. in U.S. patent application Ser. No. 12/074,727, the entire disclosure of which is hereby incorporated herein by reference.

One of ordinary skill in the art should understand that the diffusion medium layer 20 formed from the radiation-sensitive material may be carbonized to cause the diffusion medium layer 20 to be electrically conductive. Open-cellular carbon microstructures and a method of making the same from a polymer template material is disclosed by Jacobsen in U.S. patent application Ser. No. 11/870,379, the disclosure of which is hereby incorporated herein by reference in its entirety. Other suitable methods for carbonizing the radiation-cured polymer forming the diffusion medium layer 20 may also be used.

In a further embodiment, at least one of the microtruss structure 200 and the grids 202, 204 may be formed from radiation-sensitive material that is electrically conductive when cured. Where the radiation-sensitive material is electrically conductive, the coating of the electrically conductive material on at least one of the microtruss structure 200 and the grids 202, 204 of the diffusion medium layer 20 may not be employed.

One of ordinary skill in the art may select the suitable dimensions for the diffusion medium layer 20 as desired. As a nonlimiting example, the thickness of the diffusion medium layer 20 may be between about 50 microns and about 250 microns, particularly between about 100 microns and 200 microns, and most particularly about 150 microns. At least one of the first, second, third, and fourth truss elements 205, 207, 209, 211 of the microtruss 200, and the first and second walls 214, 216 of the grids 202, 204, may have a thickness of up to about 50 microns, particularly up to about 35 microns, and most particular up to about 20 microns. Other appropriate dimensions for the microtruss structure 200 and the grids 202, 204 may also be selected to optimize the performance of the fuel cell stack 2.

The diffusion medium layer 20 according to the present disclosure, and in particular the microtruss structure 200, may further have a spatially varying mass transport resistance for controlling water management in the fuel cell stack 2. The spatially varying mass transport resistance may be obtained by adjusting at least one of a porosity, a tortuosity, a pore size, and a thickness of the diffusion medium layer 20 formed from the radiation-sensitive material. The spatially varying mass transport resistance may be selected as described in U.S. application Ser. No. 11/778,741 to Berning, hereby incorporated herein by reference in its entirety, for example. The diffusion medium layer 20 may be formed with a plurality of sections having different mass transport resistance, such as an upstream section and a downstream section. The upstream section may have a structure for preventing a drying-up of the fuel cell stack 2 and the downstream section has a structure for preventing a flooding of the fuel cell stack 2. It should be appreciated that the spatially varying mass transport resistance may be readily selected through formation of the diffusion medium layer 20 from the radiation-sensitive material as described herein.

Figure 5:
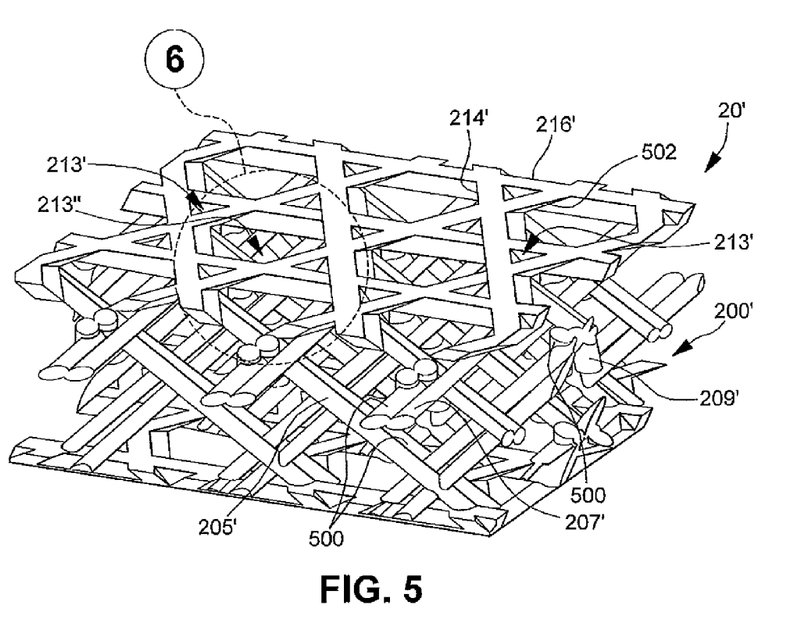
FIG. 5 is a partial, side perspective view of a diffusion medium layer according to another embodiment of the present disclosure, having a plurality of offset truss elements.
Figure 6:
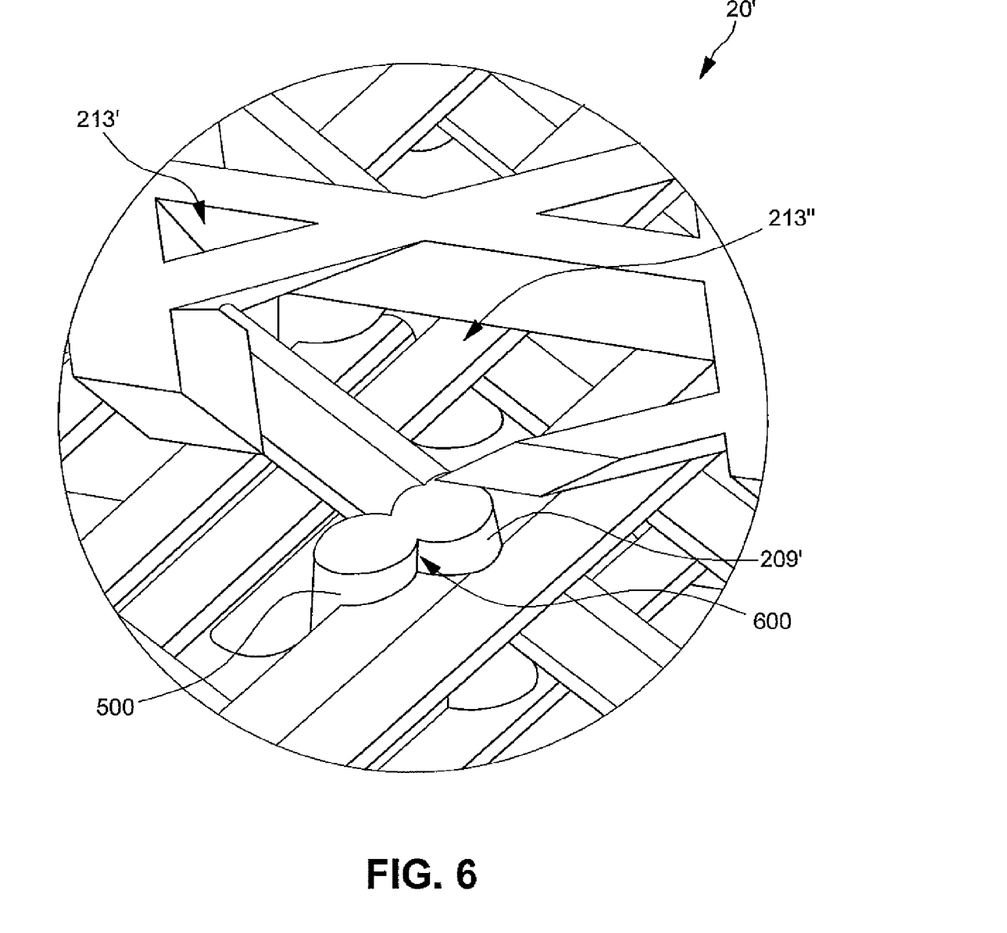
FIG. 6 is a enlarged, fragmentary perspective view of the diffusion medium layer shown in FIG. 5, further showing acute corners.

An alternative embodiment of the present invention is shown in FIGS. 5 to 6. Like structure from FIGS. 1 to 4 have the same reference numeral and a prime (') symbol or a double-prime (") symbol for purpose of clarity. The diffusion medium layer 20' may include a microtruss structure 200' having a plurality of offset truss elements 500. The offset truss elements 500 may be at least partially disposed adjacent at least one of the first, second, and third truss elements 205', 207', 209'. As shown in FIG. 6, the offset truss elements 500 may form an acute corner 600 with one of the first, second, and third truss elements 205', 207', 209' adjacent which the offset truss elements 500 are disposed. The acute corner 600 may form water wicking paths that facilitate removal of water during operation of the fuel cell stack 2.

The grids 202', 204' of the diffusion medium layer 20' may further be formed from a plurality of third walls 502. The first, second, and third walls 214', 216', 502 may intersect to form a plurality of first openings 213' and a plurality of second openings 213". Although the openings 213, 213', 213" formed from the plurality of first walls 214, 214' and the plurality of second walls 216, 216' are generally quadrilateral-shaped, a skilled artisan should understand that other shapes of the openings 213, 213', 213" may also be employed. For example, the first openings 213' may have a generally triangular shape and the second openings 213" may have a generally hexagonal shape. The first openings 213' may have a size that facilitates the water transport from the fuel cell stack 2 and the second openings 213" may have a size that facilitates distribution of reactants to the fuel cell stack 2. In a particular embodiment, the first openings 213' have a smaller average diameter than the second openings 213". For example, the average diameter of the first openings 213' may be less than about 50 microns, particularly less than about 40 microns, and most particularly less than about 30 microns. In another example, the average diameter of the second openings 213" may be less than about 115 microns, particularly less than about 100 microns, and most particularly less than about 85 microns. Other suitable shapes and dimensions for the openings 213, 213', 213" may be selected, as desired.

The present disclosure further includes a method for fabricating the diffusion medium layer 20. As shown in FIGS. 7-10, the method includes the step of first providing a substrate 700 onto which the diffusion medium layer 20 is to be formed. The substrate 700 may be formed from any material that permits the formation of polymeric structures thereon. The substrate 700 may be electrically nonconductive such as plastic, or electrically conductive such as stainless steel. The substrate 700 may have holes or vias formed that facilitate a removal of excess uncured radiation-sensitive material following the fabrication of the diffusion medium layer 20. It should be appreciated that the term "uncured radiation-sensitive material" may also include dissociated radiation-sensitive material within the scope of the present disclosure.

Figure 7:
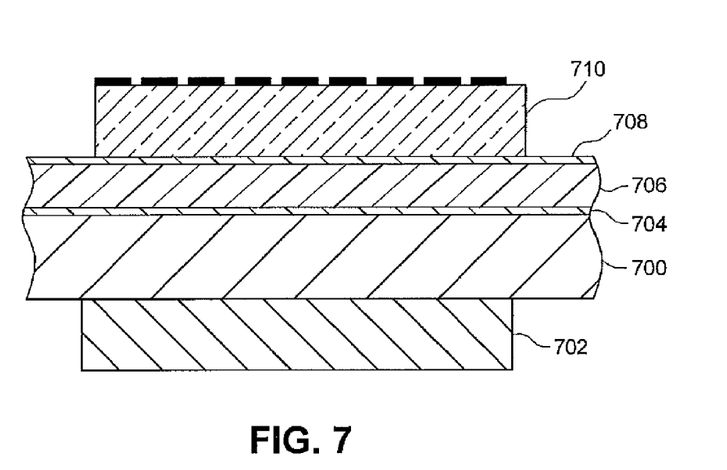
FIG. 7 is a schematic side sectional view of a mask disposed on radiation-sensitive materials according to a method of the present disclosure.

The substrate 700 may further be provided with a coating or surface treatment for bonding and debonding from the diffusion medium layer 20. As a nonlimiting example, the substrate 700 may have a coating adapted to bond with the uncured radiation-sensitive material. The surface treatment may further facilitate a debonding of a cured polymer from the substrate 700. In particular, a backside of the substrate 700 that is typically disposed on a flat surface or a stationary base plate 702 during fabrication of the diffusion medium layer 20 may have a coating to militate against an undesired contamination or plating of the substrate 700. The stationary base plate 702 may be a porous vacuum chuck having a pressure-facilitated release, for example. A skilled artisan may select suitable surface treatments, including coatings, as desired.

The method further includes the steps of applying a first radiation-sensitive material 704, a second radiation-sensitive material 706, and a third radiation-sensitive material 708 to the substrate 700. The second radiation-sensitive material 706 is disposed between the first radiation-sensitive material 704 and the third radiation-sensitive material 708. The first, second and third radiation-sensitive materials 704, 706, 708 may be applied one at a time or may be pre-laminated and then applied to the substrate 700, as desired. A mask 710 is disposed between at least one radiation source 712 and the first, second, and third radiation-sensitive materials 704, 706, 708. The mask 710 may be shaped to conform to a desired surface, for example. The mask 710 may extend along a single plane or multiple planes, as desired. In certain embodiments, the mask 710 may have multiple heights to form the diffusion medium layer 20 having regions with different thicknesses.

Figure 8:
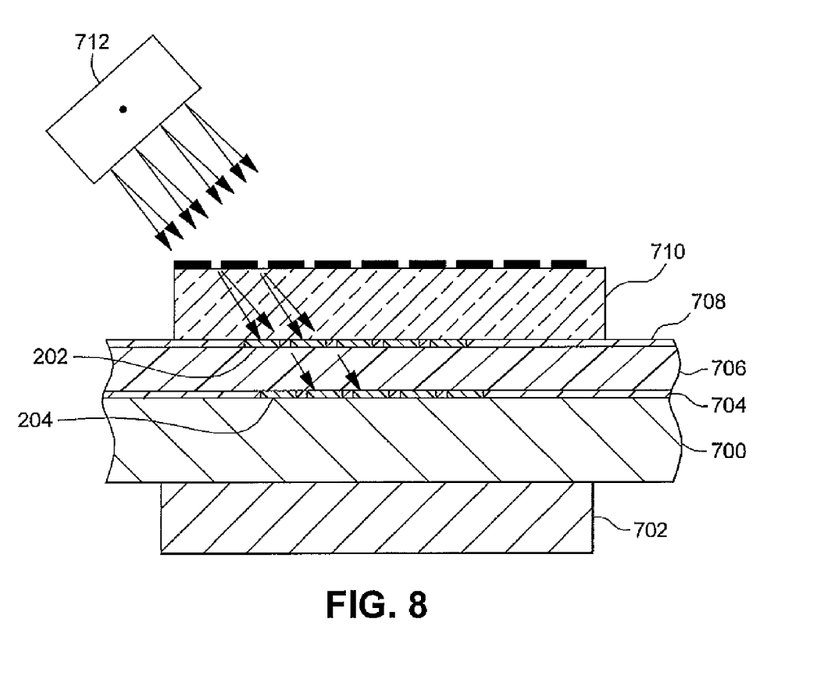
FIG. 8 is a schematic side sectional view of the mask and radiation-sensitive material shown in FIG. 7, further showing exposure of the radiation-sensitive materials to at least partially decollimated radiation beams.
Figure 9:
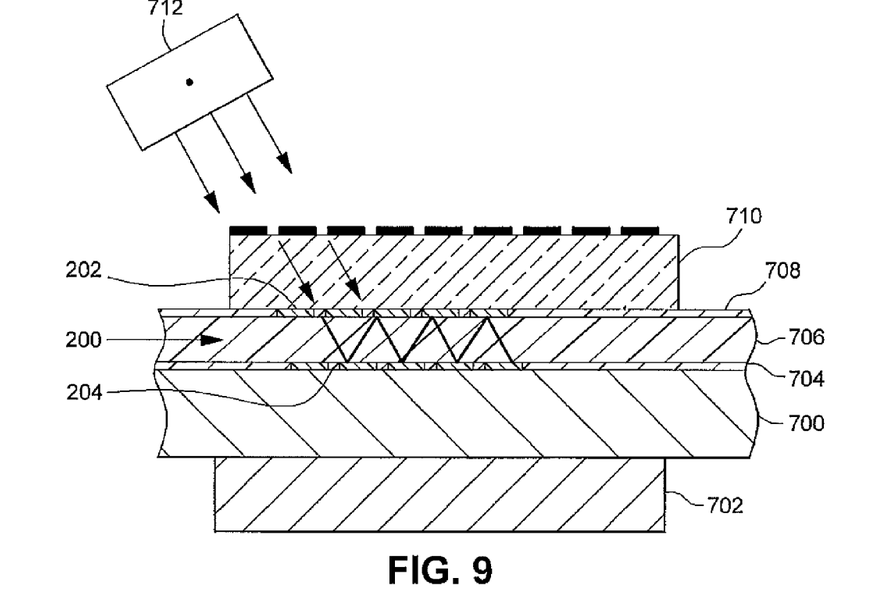
FIG. 9 is a schematic side sectional view of the mask and radiation-sensitive materials shown in FIGS. 7 and 8, further showing exposure to collimated radiation beams.

The first, second, and third radiation-sensitive materials 704, 706, 708 are simultaneously exposed to a plurality of at least partially decollimated radiation beams through the radiation-transparent apertures in the mask 710. The at least partially decollimated radiation beams may be provided, for example, by a moving collimated beam. The pair of grids 202, 204 is thereby formed in the first and third radiation-sensitive materials 704, 708. The first, second, and third radiation-sensitive materials 704, 706, 708 are then simultaneously exposed to a plurality of collimated radiation beams through the radiation-transparent apertures in the mask 710. The microtruss structure 200 is thereby formed in the second radiation-sensitive material 706 between the pair of grids 202, 204. It should be understood that the formation of the microtruss structure 200 and the grids 202, 204 according to the present method facilitates a proper alignment of the microtruss structure 200 with the grids 202, 204. Further, it should be understood that both the formation of the microtruss structure 200 and the grids 202, 204 may be formed with the same mask 710 by varying the radiation beams from at least partially decollimated to collimated. Additional masks may also be employed, as desired.

One of ordinary skill in the art should understand that the formation of the microtruss structure 200 from the second radiation-sensitive material 706, and the formation of the grids 202, 204 from the first and third radiation-sensitive materials 704, 708, may be facilitated by providing the first and third radiation-sensitive materials 704, 708 with a faster rate of cure than the second radiation-sensitive material 706. In an alternative embodiment, the first, second, and third radiation-sensitive materials 704, 706, 708 may be selected such that a first type of radiation cures the first and third radiation-sensitive materials 704, 708 and a second type of radiation cures the second radiation-sensitive material 706. Suitable radiation-sensitive materials and types of radiation for at least one of initiating, polymerizing, and crosslinking the radiation-sensitive materials may be selected, as desired.

The method of the present disclosure further includes the step of removing an uncured volume of the first, second, and third radiation-sensitive materials 704, 706, 708 following the steps of exposing the first, second, and third radiation-sensitive materials 704, 706, 708 to the at least partially decollimated and collimated radiation beams. The method of the present disclosure may further include the step of curing the exposed material during the exposure or in a secondary curing step such as heating. The microtruss structure 200 and the grids 202, 204 may then be at least one of coated with the electrically conductive material, coated with a metal oxide or ceramic, and carbonized, if desired, as described hereinabove. In an additional step, the diffusion medium layer 20 having the microtruss structure 200 and the grids 202, 204 may be removed from the substrate 700. The coating may be a relatively thin layer to maintain dimensions prior to removing the substrate 700, or a heavy ductile coating, as desired. A finishing coating on the surfaces of the microtruss structure 200 and the grids 202, 204 with the selected electrically conductive material may then be applied.

Figure 10:
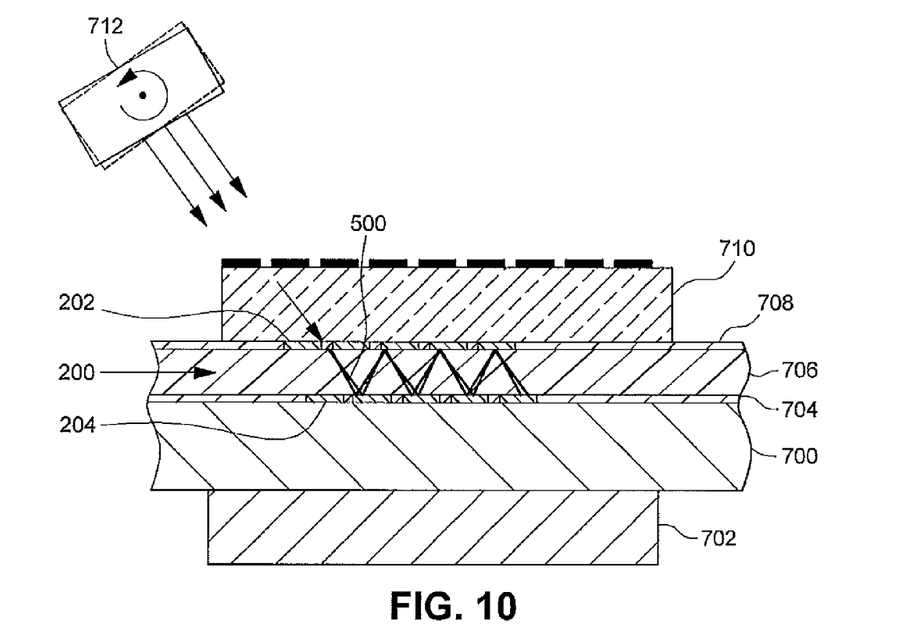
FIG. 10 is a schematic side sectional view of the mask and radiation-sensitive materials shown in FIGS. 7, 8, and 9, further showing formation of offset truss elements according to the present disclosure.

In another embodiment, the method may include the step of rotating the at least one radiation source 712 out of plane during the formation of the microtruss structure 200. The at least one offset truss element 500 disposed adjacent at least one of the first truss element 205, the second truss element 207, the third truss element 209, and the fourth truss element 211 may thereby be formed. Likewise, the acute corners 600 for wicking water away from the MEA 3 during operation of the fuel cell stack 2 are also formed by the formation of the offset truss elements 500.

It is surprisingly found that the employment of the microtruss structure 200 and the grids 202, 204 formed from radiation-sensitive materials allows for the cost effective production of the diffusion medium layer 20 for use in the fuel cell stack 2. The present fabrication methodology is also less expensive than conventional forming methods, and allows the diffusion medium layer 20 of various configurations, including spatially varying mass transport resistance, to be fabricated with significantly reduced lead times. In particular, production cost reductions may result from replacement of the conventional carbon paper diffusion media.

While certain representative embodiments and details have been shown for purposes of illustrating the invention, it will be apparent to those skilled in the art that various changes may be made without departing from the scope of the disclosure, which is further described in the following appended claims.

What is claimed is:

1. A diffusion medium layer for a fuel cell comprising an electrically conductive microtruss structure disposed between a pair of electrically conductive grids, at least one of the microtruss structure and the grids formed from a radiation-sensitive material.

2. The diffusion medium layer of claim 1, wherein the microtruss structure includes a plurality of first truss elements extending along a first direction, a plurality of second truss elements extending along a second direction, and a plurality of third truss elements extending along a third direction.

3. The diffusion medium layer of claim 2, wherein the first, second, and third truss elements interpenetrate each other at a plurality of nodes to form a substantially continuous, three-dimensional self-supporting structure.

4. The diffusion medium layer of claim 3, wherein at least a portion of the nodes is formed adjacent one of the grids.

5. The diffusion medium layer of claim 2, wherein an offset truss element is disposed adjacent at least one of the first, second, and third truss elements to form an acute corner therewith.

6. The diffusion medium layer of claim 1, wherein at least one of the grids includes a plurality of first walls extending along a first direction and a plurality of second walls extending along a second direction, wherein the first and second walls form a plurality of quadrilateral openings.

7. The diffusion medium layer of claim 5, wherein at least one of the grids includes a plurality of third walls extending along a third direction, wherein the first, second, and third walls form a plurality of triangular openings and a plurality of hexagonal openings, the triangular openings smaller than the hexagonal openings.

8. The diffusion medium layer of claim 1, wherein at least one of the grids has a substantially planar surface.

9. The diffusion medium layer of claim 1, wherein at least one of the microtruss structure and the grids have an electrically conductive coating.

10. The diffusion medium layer of claim 8, wherein the electrically conductive coating is one of a metal and a ceramic.

11. The diffusion medium layer of claim 1, wherein at least one of the microtruss structure and the grids are carbonized.

12. The diffusion medium layer of claim 1, wherein the microtruss structure has a spatially varying mass transport resistance.

13. A fuel cell, comprising:
a membrane electrode assembly having an electrolyte membrane disposed between a pair of electrodes;
a pair of diffusion medium layers having the membrane electrode assembly interposed therebetween, at least one of the diffusion medium layers including an electrically conductive microtruss structure disposed between a pair of electrically conductive grids, at least one of the microtruss structure and the grids formed from a radiation-sensitive material; and
a pair of electrically conductive fuel cell plates, wherein the membrane electrode assembly and the diffusion medium layers are disposed between the fuel cell plates.

14. A method for fabricating a diffusion medium layer for a fuel cell, comprising the steps of:
providing a substrate;
applying a first radiation-sensitive material, a second radiation-sensitive material, and a third radiation-sensitive material to the substrate, the second radiation-sensitive material disposed between the first radiation-sensitive material and the third radiation-sensitive material;

placing a mask between an at least one radiation source and the first, second, and third radiation-sensitive materials, the mask extending along a single plane and having a plurality of substantially radiation-transparent apertures formed therein;

exposing the first, second, and third radiation-sensitive materials to a plurality of at least partially decollimated radiation beams through the radiation-transparent apertures in the mask, whereby a pair of grids are formed in the first and third radiation-sensitive materials; and exposing the first, second, and third radiation-sensitive materials to a plurality of collimated radiation beams through the radiation-transparent apertures in the mask, whereby a microtruss structure is formed in the second radiation-sensitive material between the pair of grids.

15. The method of claim 14, further comprising the step of removing an uncured volume of the first, second, and third radiation-sensitive materials following the steps of exposing the first, second, and third radiation-sensitive materials to the at least partially decollimated and collimated radiation beams, wherein at least one of the first, second, and third radiation-sensitive materials is at least partial cured prior to removing the uncured volume.

16. The method of claim 14, further comprising the step of coating at least one of the pair of grids and the microtruss structure with an electrically conductive material.

17. The method of claim 14, further comprising the step of carbonizing the pair of grids and the microtruss structure.

18. The method of claim 14, wherein the first and third radiation-sensitive materials have a faster rate of cure than the second radiation-sensitive material.

19. The method of claim 14, wherein a first type of radiation cures the first and third radiation-sensitive materials and a second type of radiation cures the second radiation-sensitive material.

20. The method of claim 14, further comprising the step of rotating the at least one radiation source out of plane during the formation of the microtruss structure to provide at least one offset truss element disposed adjacent at least one of a first truss element, a second truss element, and a third truss element of the microtruss structure.

* * * * *